A. B. LANDIS.
CHANGE SPEED TRANSMISSION GEARING.
APPLICATION FILED JULY 11, 1916.

1,296,532.

Patented Mar. 4, 1919.
10 SHEETS—SHEET 1.

A. B. LANDIS.
CHANGE SPEED TRANSMISSION GEARING.
APPLICATION FILED JULY 11, 1916.

1,296,532.

Patented Mar. 4, 1919.
10 SHEETS—SHEET 4.

WITNESSES

INVENTOR

UNITED STATES PATENT OFFICE.

ABRAHAM B. LANDIS, OF ENFIELD, PENNSYLVANIA.

CHANGE-SPEED TRANSMISSION-GEARING.

1,296,532. Specification of Letters Patent. Patented Mar. 4, 1919.

Application filed July 11, 1916. Serial No. 108,739.

*To all whom it may concern:*

Be it known that I, ABRAHAM B. LANDIS, a citizen of the United States, residing at Enfield, in the county of Montgomery and State of Pennsylvania, have invented certain new and useful Improvements in Change - Speed Transmission - Gearing, of which the following is a specification.

My said invention relates to change speed transmission gearing adapted more especially for motor cars, although the device could be used for other purposes where change speed transmission is required. It is an improvement on the device in my application Serial No. 72,237 filed January 15, 1916 but has the same object as said device to secure an easy change of speed of the car by the movement of a single element with the absolute avoidance of clash of gearing or shock in the change characteristic of change speed devices in general use, and having positive driving action. This construction has the advantage over my former applications, that of more durability and greater ease of operation with positiveness of operation regardless of how quickly or how slowly the operator moves the element which automatically changes from one speed to another, assuring the positive driving connection without any clashing of gearing, shock, or noise—the change being made with absolute quietness.

The device will be fully described and claimed in the accompanying drawings and specification. In the drawings of which like reference characters indicate like or same parts.

In said drawings the part marked A is the gear casing and B the cover for same inclosing the interior parts. C is a chassis of a motor car, D the motor fly wheel, E the motor, F a foot lever for starting the car, and G a shaft located beside the steering wheel post with a small lever at its top and beneath the steering wheel (not shown) by which the change speeds are effected, all of which parts require no specific description except as they shall be referred to in describing the device.

The gear comprises a driving shaft 15 and a driven shaft 16, said shaft 15 is journaled in a bearing 18 secured to a cross web 17 of casing A, and in a hub of a frictional clutch bell 20. The hub of said bell is journaled in a bearing 21 which is secured to the end of the casing A. The outer end of said hub has secured thereto a flange 22 which is secured to the flange of a motor shaft or any source of power. As the frictional clutch is the same as shown and described in my application Serial No. 72,237 and forms no part of the present invention a specific description is not required.

The driven element 21 of said clutch is secured to shaft 15 and said clutch is made active by pressing the disk 29 through means of levers 31 and rollers 30 which engage therewith, their action being later described.

A disk 29 is secured to a hub 28, said hub having projecting portions 32 which engage with dogs 35—35 (see Fig. 6) pivoted in slots of a collar 34 secured to shaft 15 by which said frictional clutch is locked into engagement and is closed either by the foot lever or automatically by power as will later be described. The device being the same as my last named application and forming no part of this present invention a full description is not necessary here.

Figure 8:
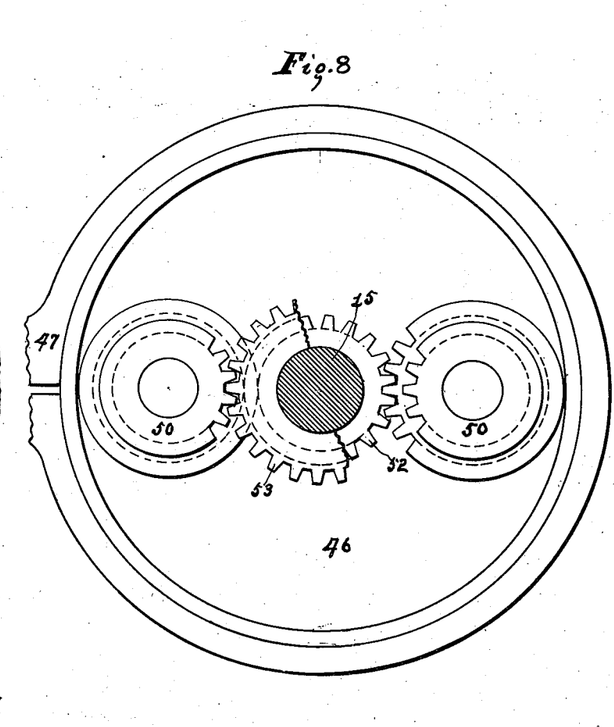
Fig. 8 is a partial cross section on line 8—8 of Fig. 1 looking in direction of arrow.

To said collar 34 is secured a bevel gear 37 which meshes with a similar gear 38 on a shaft of an ordinary gear pump located beneath shaft 15 and submerged in the oil used for lubricating and which oil said pump circulates, the object of which will be later described. On shaft 15 is a disk 42 said disk having a hub 61, which is slidable on said shaft but positively rotates therewith. Adjoining said disk is loosely mounted on said shaft 15 a housing 46 having two planetary studs with double gears of different size 50—50 mounted on same (see Figs. 1 and 8), one size of said double gear meshing with an integral pinion 52 on shaft 15, the other size of said gear meshing with a loosely mounted pinion 53 on said shaft. Said pinion 53 being secured to another housing 54 (preferably by screw threads) forms the center or bearing on said shaft 15 for said housing 54. Within a flange on said housing is secured to shaft 15 a pinion 55, said pinion also forms a bearing in said flange as well as in shaft 15 for said housing to rotate upon. Said housing has also two planetary pinions 51—51 mounted on studs. Said planetary pinions meshing with said pinion 55 and with an internal gear ring 58 encircling said housing.

Figure 2:
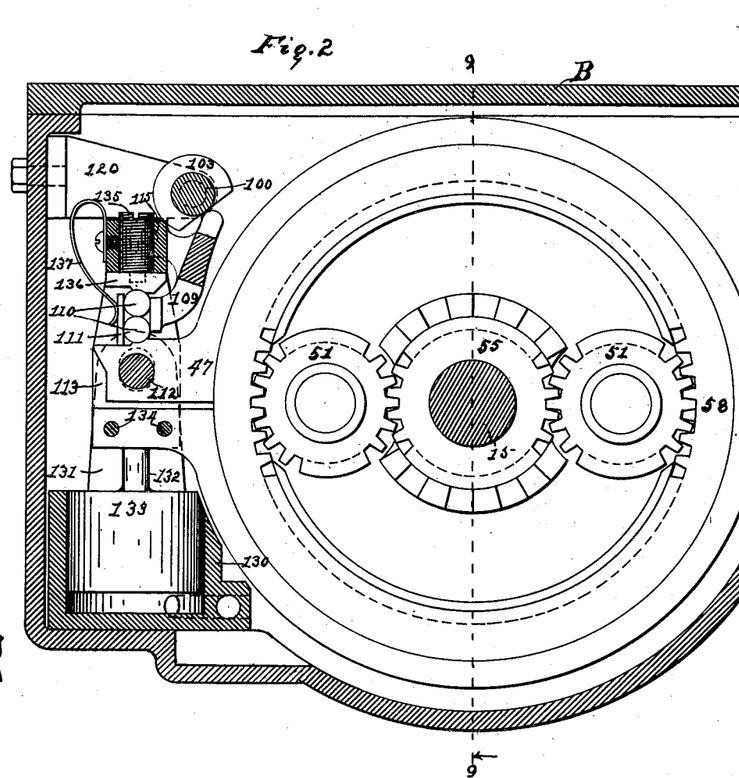
Fig. 2 is a vertical cross section taken on line 2—2 of Fig. 1 looking in direction of arrow.

Grip rings 47—47 are fitted around housing 46 and said internal gear ring 58. These bands are slitted on the one side as shown in Fig. 2 and its operation will be later described. Both housings are normally loose upon shaft 15 and the pinions engaging their planetary gears are secured to said shaft, and as long as said housing 46 and gear ring 58 are free to turn no motion will be transmitted to shaft 16 since they will revolve while shaft 16 is stationary.

On housing 46 a flange having a tapered inner surface is arranged to be engaged by a grip ring 44 mounted on the disk 42, said ring is held against rotation with the disk by pins 60 and adjustment for the proper amount of grip is made with ring 43 which is screw threaded to said disk 42. The hub 61 of said disk is journaled in the bearing 18 and being slidable allows an end pressure to engage the grip ring 44 with the housing 46. The manner in which this pressure is produced will be later described.

Figure 3:
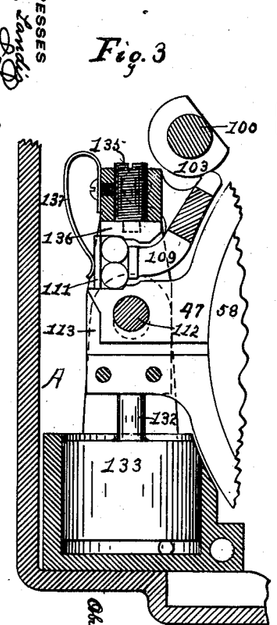
Fig. 3 is a part of same section as Fig. 2 showing the gripping element released.

The grip rings 47—47 (see Figs. 2 and 3) being slitted on one side forms an upper and lower lugs which allows the engagement of these with the internal gear 58 and housing 46. The upper lug of these rings has a perforation in which engages a pin 112. This pin also engages with three lugs 131 on lower base 130 which is secured to casing A by screws. The said base has cylinders beneath the lug of each grip ring 47. In said cylinder is fitted a plunger 133, a projecting pin 132 on said plunger engages the lower lug of the grip ring 47. A pressure beneath said plungers closes the grip ring upon their respective parts they encircle, holding same against rotation. A yoke or clevis 113 is secured at its lower end with said lug by rivets or bolts 134 and passes up on each side of the upper lug of said grip rings. A screw threaded perforation on the top of said yoke receives a screw 135. A plate 136 fitted between the legs of said yoke is engaged by said screw. The lower face of said plate has offset bearings for the engagement with rollers 110. The upper surface of the upper lug on grip ring 47 has similar offsets on same. A lever 109 with a flat surface engaging rollers 110 is pivoted to the yoke 113 by screws 115 on each side of the same. The upper end of said lever 109 engages with a cam 103 on shaft 100 the operation of which will be later described. As shown in Fig. 3 this grip ring 47 is released from its engagement and the part within it is free to revolve. A plate 111 bears against the outer or opposite side of rollers 110 and is held with slight tension by spring 137. When a pressure underneath the lower lug is exerted through the medium of the plunger 133 the grip ring is set upon the part it encircles positively holding same in a locked position. When this occurs the yoke 113 moves up and allows rollers 110 to pass up on the raised surface of said upper lug and the plate 136 by the pressure of the spring 137 as shown in the position in Fig. 2. The said surfaces for the seating of said rollers 110 being then parallel, there is no tendency with the light pressure spring 137 for same to disengage, and due to the ease of which a rolling surface moves, little exertion is required to move said rollers off the raised seats by lever 109 when required. The screw 135 has for its object to retain nearly all the pressure of the grip ring exerted by the plungers below. It will be seen that the grip ring holds from rotation the gear ring 58 for the slowest or first driving speed which gives that speed and motion. In the case of gripping the housing 46 which gives the second speed, it is in like manner attained.

Figure 6:
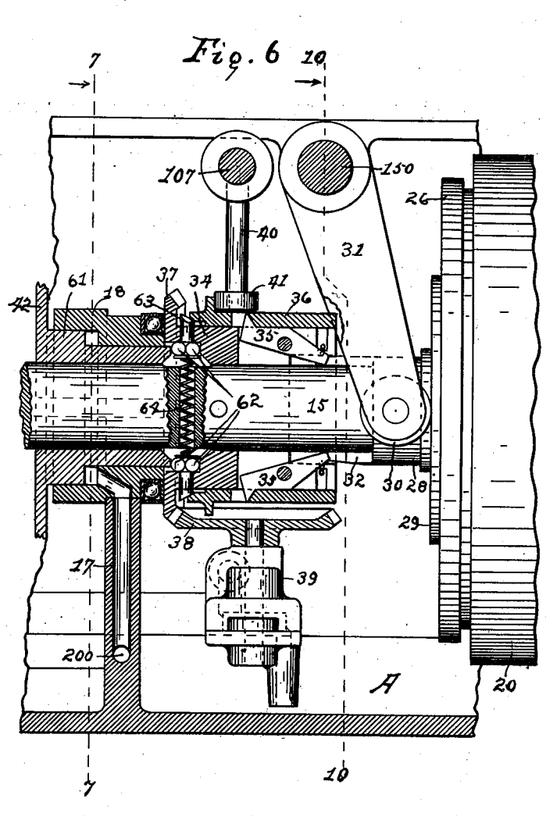
Fig. 6 is a vertical longitudinal central cross section taken on line 6—6 of Fig. 7 looking in direction of arrow.
Figure 7:
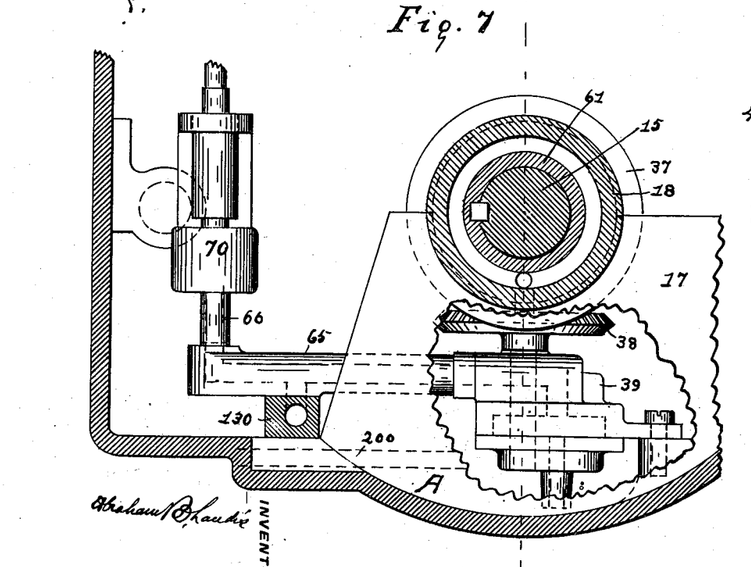
Fig. 7 is a vertical cross section taken on line 7—7 of Fig. 6 looking in direction of arrow.
Figures 15, 16, 17:
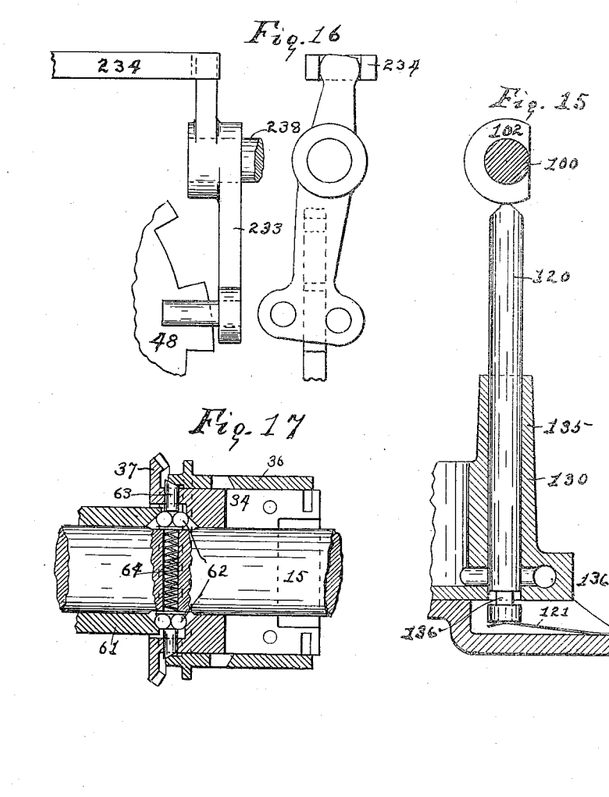

In the case of the third speed the hub 61 of disk 42 fitting into bearing 18 having two sizes thereon forms and acts as a plunger. When a pressure is exerted against this plunger the grip ring 44 through the disk 42 is engaged. The said disk being somewhat yielding an excessive pressure can be brought on said grip ring so that when it is locked in position a slight release will not release said grip. The hub 61 of said disk as well as the collar 34 which is secured to shaft 15 have beveled recesses as shown in Fig. 6, this grip is there shown in locked position. Fig. 17 shows same in released position. Rollers 62, one pair on each side of the shaft, rest in the recesses formed by the beveled edges and allow the said disk 42 to withdraw ring 44 from the flange of the housing 46 by the spring 45 in the hub of 46 (preferably two in number). When pressure is exerted to close said grip the hub 61 passes away from collar 34 and spring 64 in a cross perforation of shaft 15 presses the rollers 62 outwardly until they rest on parallel seats on said hub and collar and locks same and in like manner as in the case of the grip rings there is no tendency for them to move. This locked position is shown in Fig. 6. To release this grip small pins 63 with an outer beveled face are engaged by a flange on the collar 36, said collar being moved endwise depresses these pins pushing said rollers 62 inwardly from their seats against the light tension of spring 64 and through spring 45 same is released.

Figure 12:
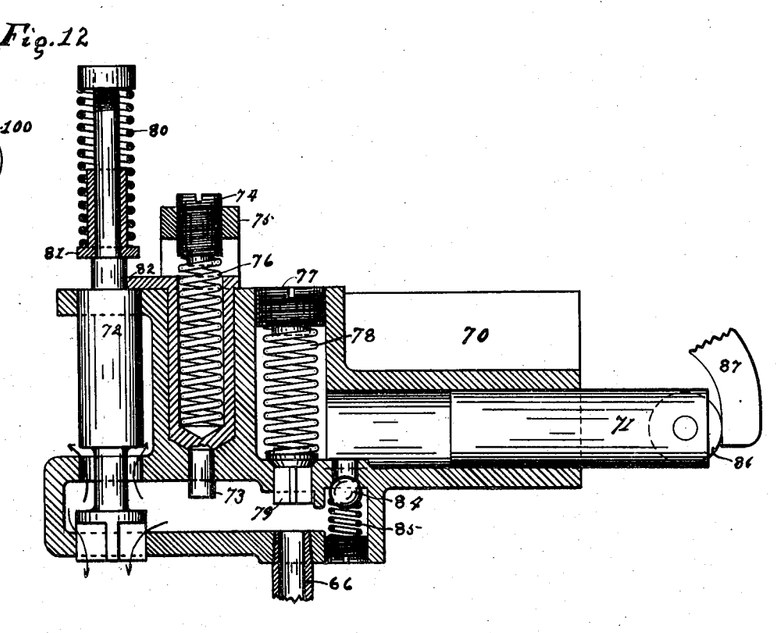
Fig. 12 is a device which sets the frictional clutch by hydraulic means and controls the pressure on same and its release.

The pump 39 is of common gear construction and needs no description. It is positively geared to shaft 15 as is shown. It has a lower inlet extending to the bottom of the casing A. Its outlet is through the pipe 65. Said pipe connects with one end of the base 130 and also connects by means of pipe 66 with device 70 which sets the frictional clutch and controls the pressure of the oil which I will here describe and which is fully illustrated in Fig. 12 on enlarged scale. It consists of a cylinder containing a plunger 71 with a roller 86 on its end which engages with a lever 87 which is secured to shaft 150 upon which levers 31 are secured which serves to automatically close the frictional clutch at the proper time. 79 is a valve which has a given pressure upon it by spring 78. Screw plug 77 is for adjusting said pressure. 73 is a plunger which is also arranged for adjustment of pressure through spring 76 with screws 74. 72 is a valve forming outlets. As shown, this double valve is open allowing a free flow of the oil without pressure (as the opening is very large). A collet 81 fits over the upper stem of this valve and rests against a lower shoulder, a spring 80 exerts a light pressure on said collet which is held by the nut on the top. A small valve (shown of ball type) 84 has a light spring 85 below it to normally hold it closed. The oil passage from the pump also connects with the three gripping elements for the three speeds but its passages to the plungers actuating same are controlled by valves which will be later described.

Figure 4:
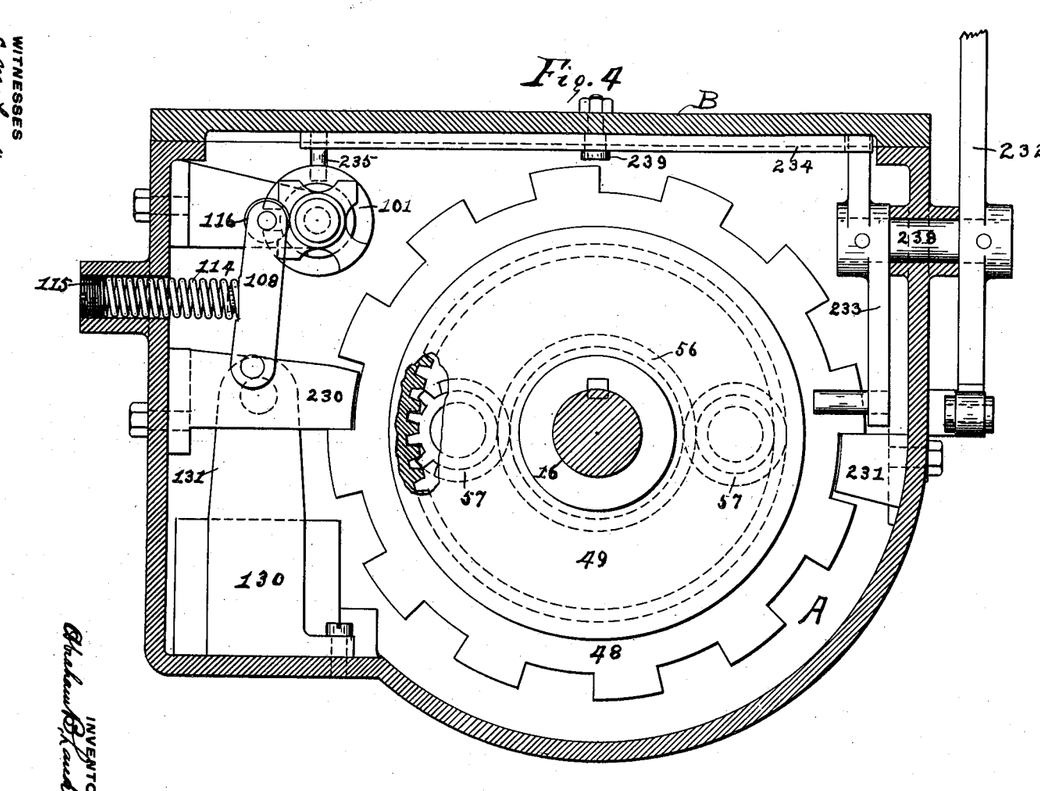
Fig. 4 is a vertical cross section on line 4—4 of Fig. 1 looking in direction of arrow.
Figure 5:
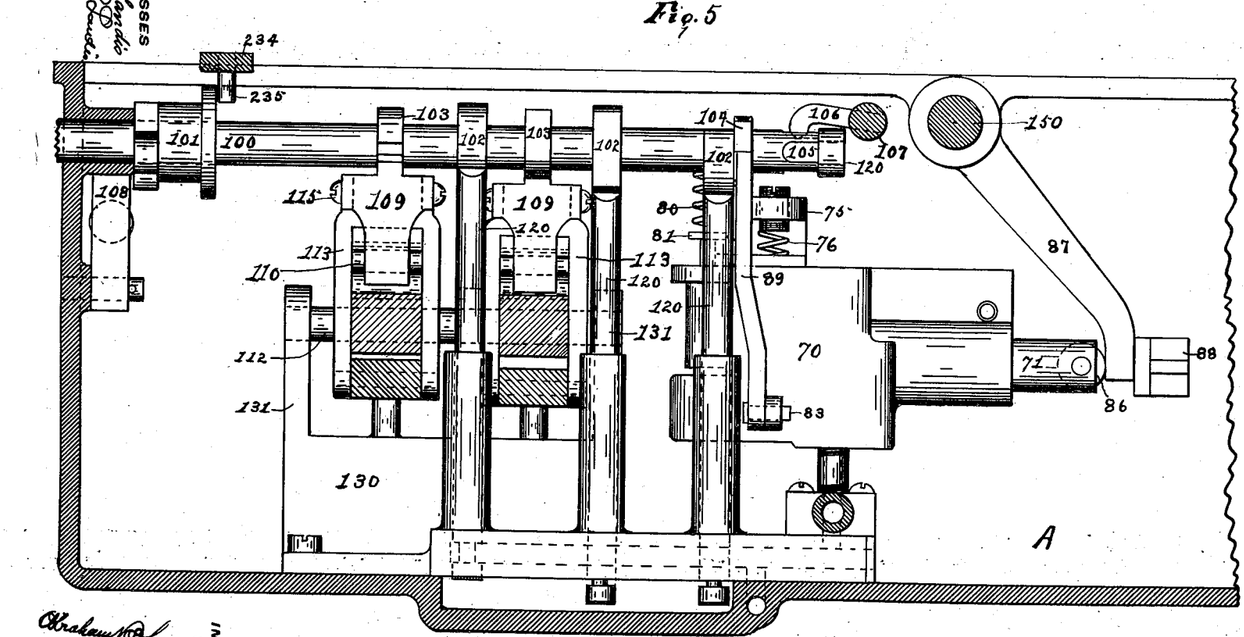
Fig. 5 is a vertical longitudinal section on line 5—5 of Fig. 1 looking in direction of arrow.

A cam shaft 100 is journaled in one end of casing A and in a bearing 120 secured to the side of said casing, best shown in Fig. 5. On this shaft are a series of cams for locking and releasing the gripping elements as well as to release and reset the frictional clutch and to produce the oil pressure for same. This shaft is arranged to rotate having four decided stopping points, controlled by the cam 101 through the spring pressed roller 116 on lever 108 which is pivoted on a pin in the end of casing A. This cam, best shown in Fig. 4, forming decided stops, serves as a feeler for the correct positions. The four points are for first speed, second speed, third speed, and stopped positions. As shown in Fig. 4, the cam is set for first speed. The direct drive or highest speed however shows that grip closed for the purpose of better illustrating it. Cams 102—102—102 on said shaft 100 operate the oil controlling valves to the different plungers. Cams 103—103 release the grip rings on first and second speeds. Cam 104 releases the collet 81 on valves 72 allowing same to drop and close, which starts the oil against such plunger for which the cam 102 has opened the valve.

Figure 14:
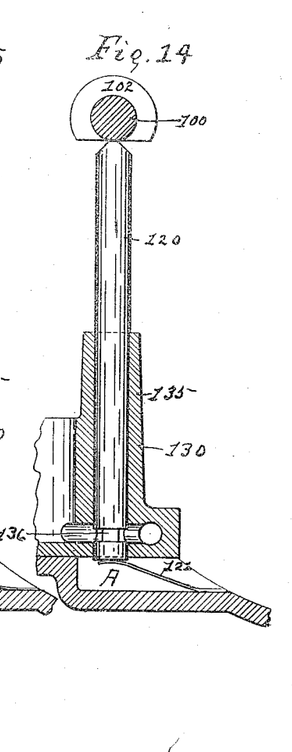
Figs. 14, 15, 16, and 17 are details of the device to more clearly show their construction and action.

The valves for controlling the flow of oil to the plungers are all the same and are illustrated in open and closed positions in Figs. 14 and 15. A valve and stem 120 neatly fit a perforation in posts 135 on base 130. The oil passages cross these perforations and are of smaller diameter than the valves. A recess cut around the valve stem makes the passage for the oil when said valve stem is raised by spring 121 which action is allowed by cam 102 whose position is controlled by the cam 101.

I will now describe this hydraulic action. As shown by the position of cam shaft and its cams, the gear is set for the first speed drive (excepting as before stated the direct drive grip should be released). By rotating the cam shaft for second speed drive, the valve 120 for first speed drive is immediately closed by cam 102 and grip ring on first speed drive is released through the cam 103 actuating the lever 109 pushing rollers 110 off their seats. Cam 105 through the arm 106 slightly rotates shaft 107. Arm 40 has a roller 41 secured to said shaft 107 (see Fig. 6) which moves collar 36 on collar 34 and unlatches the dogs 35 and through the spring 37 the frictional clutch is released. In succession the cams 104 through the catch 89 which engages with the collet 81, releases said catch from said collet and valve 72 is allowed to drop and close. As this valve is slightly unbalanced the lower valve being of slightly greater area than the upper, it is positively closed. This action stops the flow of oil through this valve and immediately the plunger for which the valve is opened operates and closes the grip. The pressure of springs on valve 79 and plunger 73 are such that the pressure will lock the grips before valve 79 will rise. Then however said valve raises and moves the plunger 71 forward against the lever 87 which closes the frictional clutch. Said lever 87 as soon as clutch is closed sufficiently so that the dogs 35 will latch it in position comes against a stop 88 secured to the side of casing A. This prevents excessive pressure to the frictional surfaces of said disk, giving them no more than is required. This stop 88 serves to allow a further excess of pressure when plunger 73, being set for greater pressure than plunger 71, will rise and through the projection 82 on plunger 73 coming in contact with collet 81 valve 72 will be raised and be again locked up by catch 89 when the oil pressure will be released and flow freely through this by pass opening. The object of the spring 80 on collet 81 is to open valve 71 fully after said collet has passed catch 88. Valve 84 has for its object to allow of a return of the plunger 71 when the frictional clutch is again released.

Figure 13:
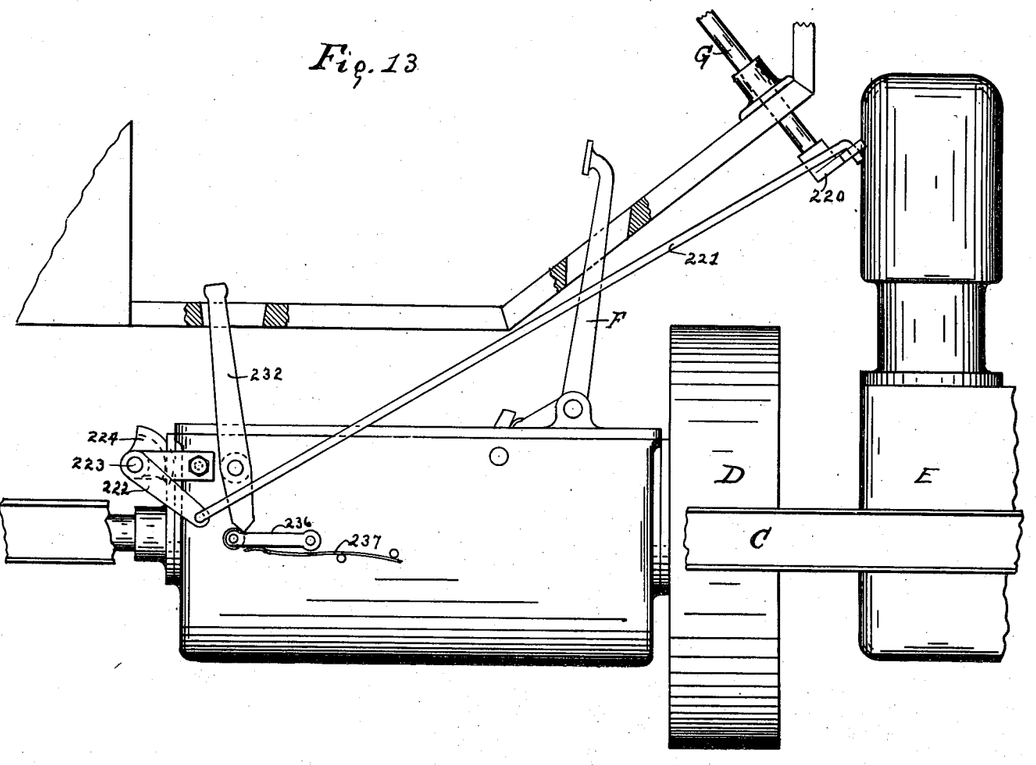
Fig. 13 is a side view of the transmission shown mounted in a motor car.

It will be noted by reference to Fig. 13 a shaft G passes up to the operator beside of the steering wheel post (not shown), the upper end of which has a lever just under the hand wheel. This wheel and lever are not shown but a description suffices to make it clear. On the lower end of said shaft G is a crank arm 220. A rod 221 connects said crank arm to another crank arm 222 which is secured to a shaft 223. The other end of said shaft 223 has a segmental bevel gear 224 (see Fig. 1) engaging with a bevel pinion 225 on cam shaft 100. So that by the movement of the hand lever beneath the steering wheel the four positions of said cam shaft are readily and easily had and due to the cam 101 are easily felt and held in position.

Figure 1:
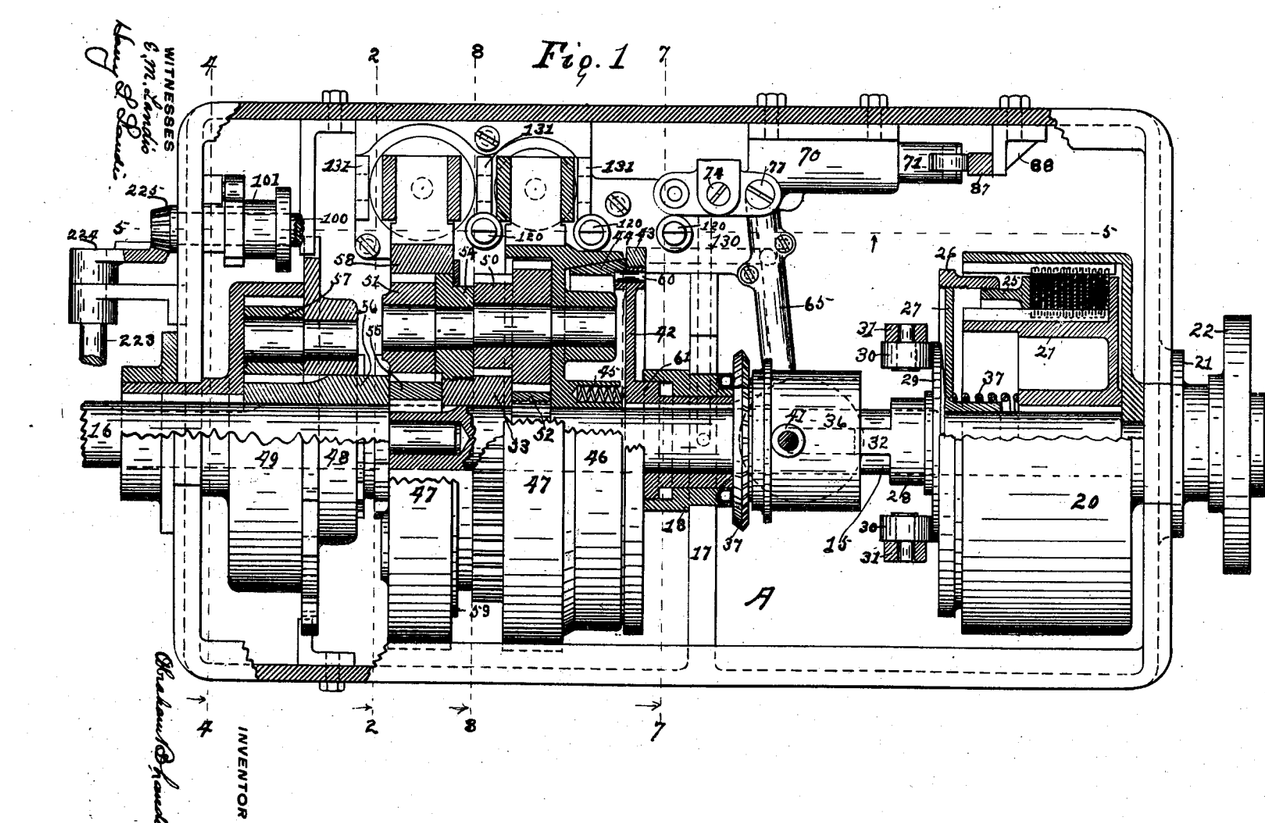
Figure 1 is a top view of the gear casing with the cover removed and the gearing therein shown in partial horizontal section.
Figure 9:
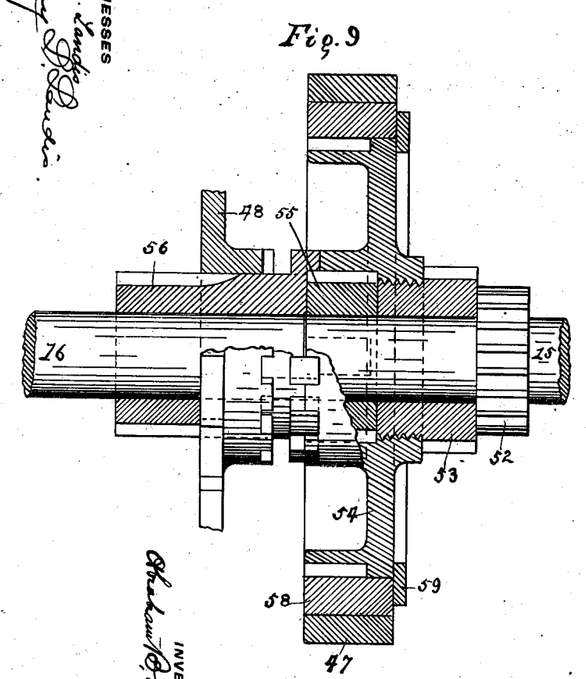
Fig. 9 is a partial longitudinal section of a clutch construction taken on center line of Fig. 1.
Figure 10:
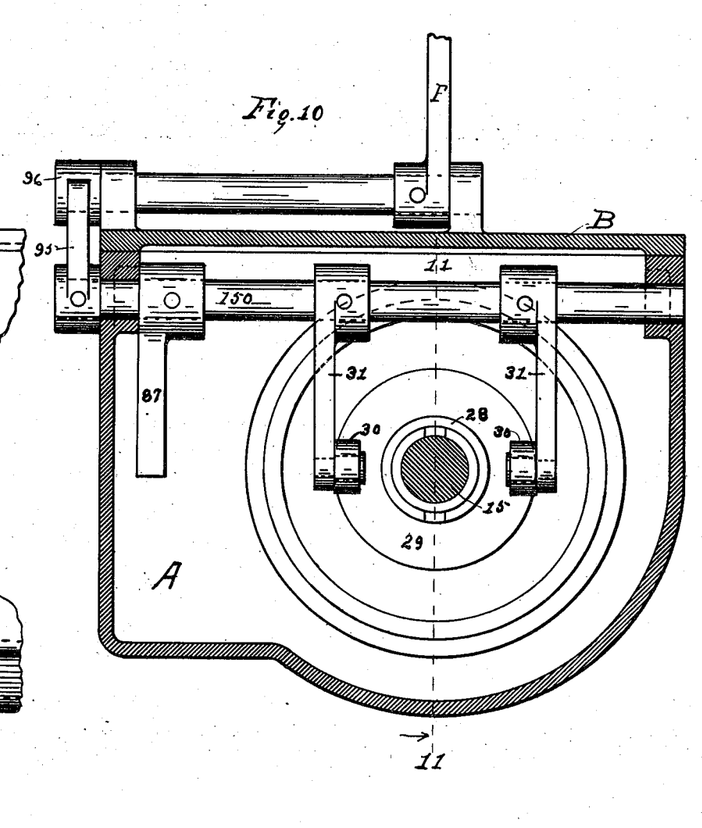
Fig. 10 is a vertical cross section taken on line 10—10 of Fig. 6 looking in direction of arrow.
Figure 11:
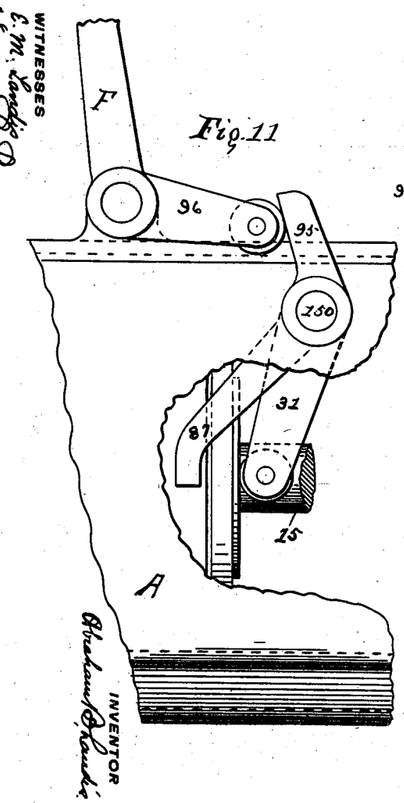
Fig. 11 is a view partly in section taken on line 11—11 of Fig. 10 looking in direction of arrow.

Fig. 4 is a vertical cross section on line 4—4 of Fig. 1 looking in direction of arrow. This shows another housing 48 with planetary pinions 57 engaging a sun pinion 56 for securing the reverse or backward movement. This sun pinion (see Fig. 9) has a notched positive clutch engagement with flange of the housing 54 surrounding pinion 55. Said pinion 56 is loosely mounted on shaft 16 the inner end of said shaft being journaled in a perforation of shaft 15 as shown in Fig. 1 in section. The clutch makes this sun pinion positively engaged at all times with the housing 54. The clutch portion on the sun pinion is also arranged on its inner portion for the engagement of the housing 48. As this device is shown said housing is unclutched from said pinion and therefore not operative for forward but backward movement. The housing 48 has a notched flange arranged to engage with lugs 230 and 231 secured to the sides of casing A. These lugs serve to hold said housing 48 against rotation and cause a reverse movement of the driven shaft 16.

This housing is loosely mounted on the sun pinion 56 and is free to slide into connection with said pinion or into engagement with lugs 230 and 231. The planetary pinions engage with said sun pinion and an internal gear 49 which is secured to shaft 16. When the housing is engaged with the clutch on the pinion, the planetary gears cannot rotate upon their studs and therefore all rotate together with said shaft and therefore in the forward speed said gears are inactive.

The means of changing from forward to backward motion and vice versa, is through lever 232 (Fig. 13) which passes up through the floor of the car and is moved back and forth by the foot of the operator. This lever pivots on a shaft 238 journaled in the casing A (see Fig. 4). A lever 236 with a spring 237 presses a roller on the end of said lever against the end of lever 232 which by its beveled end holds same in either position. Said shaft 238 has a lever 233 within the casing which projects downwardly and has two pins on its lower end, which engage with the flange of the housing 48 by which same is slid for forward and backward movement (see Fig. 16). A bar 234 is pivoted at 239 on the cover B of the casing, one end of which is bifurcated and with which the top of lever 233 engages (see Fig. 16). The other end of said bar has a downwardly projecting pin 235. This pin comes in contact with the flange on the cam 101 except that when the cam shaft is set for the stop position a notch through this flange allows said pin 235 to pass through. The object of this is to prevent the change from forward motion engagement to the backward or vice versa while the different speeds are engaged to prevent any clash with the positive clutch as this must be changed only when the car is stopped.

To recapitulate in complete succession the operation of the gear is as follows: When the car is stopped, the cam shaft 100 is set for no speed position and of course the frictional clutch is released and in this position the cam 105 on shaft 100 which controls this release has no notch for lever 106 on shaft 100 to drop into hence through the lever 40 with its roller 41 of the collar 36 is held against the latching dogs 35 preventing the clutch from being locked in this position, so that when pressing on the clutch by foot lever F in starting the car the frictional clutch will not be locked until the cam shaft 100 is turned for the first speed position which then allows arm 106 to drop into a notch forming the cam on shaft 100 which then allows the dogs 35 to lock the said clutch. Therefore when starting the car the foot lever F is pressed more or less as the speed is wanted through the slip of the frictional clutch and when wanted to move without the foot action the hand lever on shaft G controlling the speed is moved to the position for first of any of the speeds desired. When changing speed the cam shaft 100 is turned for any other speed desired and by the cams thereon the frictional clutch is first released the gripping employed at present speed is disengaged, the valve controlling the oil to plunger for selected speed is opened, the valve to plunger of speed that was in use is closed, the by pass valve 72 is dropped and closed creating oil pressure when the plunger is moved controlling the grip on the speed selected, closing same and by the spring pressed rollers is locked, the increased pressure on the oil raises valve 79 and forces the plunger 71 against lever 87 resetting the frictional clutch which is automatically locked in position by dogs 35. Lever 87 coming against stop 88 a further increase of the oil pressure raises plunger 73 which raises the by pass valve 72 and releases all oil pressure and allows of a free flow.

Briefly then the movement from one speed to another automatically, successively, and positively releases the frictional clutch, unlocks one speed, locks another and resets the frictional clutch by the easy movement of a single element—a lever beneath the hand steering wheel.

It will be noted that this gear is both selective and progressive in its speed. A change from a stop position to the highest speed can be made and highest to lowest, or in succession, and vice versa and all without any more care or attention than to move an easy moving single element.

I do not confine my invention to a hydraulic means for the automatic operations in this gearing, as other mechanical means could be devised to accomplish the same result without departing from the spirit of my invention. The hydraulic means however seems to be one that will be the simpler and least liable to disorder, and will always work with absolute quietness. What I claim in my invention is a device which automatically releases the frictional clutch and while released changes the driving connection from one speed to another and resets the frictional clutch all in proper and automatic succession without clash, noise, or shock, making same a very desirable device for quietness, durability, and ease of operation.

Having now described my said invention so that those skilled in the art may understand it, what I claim as new and desire to secure by Letters Patent is:

1. A change speed gearing comprising driving and driven elements, a frictional clutch, connecting said elements, revoluble housings on said driven element, a set of change speed gearing in each of said housings, gripping devices on said housings to hold an element of the set of change speed gearing stationary, means for automatically closing and locking said gripping devices, and means for automatically resetting the frictional clutch, substantially as described.

2. A change speed gearing comprising two shafts in alinement with each other, one of said shafts having a driven frictional clutch member secured thereon, a driving clutch member coupling therewith, a source of power connected with said driving member, said shaft having a revoluble housing thereon, change speed gearing in said housing, a grip ring encircling said housing by which one of the elements of the change speed gears is held stationary, means for automatically releasing said frictional clutch, means for automatically closing and locking said grip ring and automatic means for reengaging said frictional clutch, substantially as set forth.

3. A change speed gearing comprising a casing, two shafts in alinement journaled therein, a source of power, a frictional clutch coupling one of said shafts with said source of power, a revoluble housing, change speed gears in said housing, means for holding stationary one of the change speed gear elements, means for releasing said element, and means for releasing and automatically resetting said frictional clutch, substantially as described.

4. A change speed gearing comprising a casing, two shafts in alinement journaled therein, a frictional clutch, a plurality of housings on said shafts, change speed gear sets in each housing, means for releasing said frictional clutch, means for holding one element of the change speed gear set stationary, means for releasing said element of the change speed gear set, means for resetting the clutch, means by the movement of a single element by which in automatic succession the frictional clutch is released, one change speed set of gears is released of the load, another speed set engaged with the load and the frictional clutch is reset, substantially as described.

5. A change speed gearing comprising a casing, two shafts journaled therein, a revoluble housing on one of said shafts, a frictional clutch coupling said last named shaft with the source of power, a set of change speed gearing mounted in said housing, a grip ring encircling said housing, hydraulic means for holding stationary one of the elements of the change speed gear, means for releasing said frictional clutch, means for releasing said grip, hydraulic means for locking said grip, and hydraulic means for resetting the frictional clutch, substantially as described.

6. A change speed gearing comprising a casing, a frictional clutch, a shaft, the source of power coupled with said shaft by said frictional clutch, revoluble housings on said shaft, a set of change speed gears on each housing, means by which one element of said change speed gears is held stationary, making the driving action through them, means by which same is released, a series of cams on a single element, means by which with a single movement of said element the said frictional clutch is released, the stationary element of one of the sets of change speed gears is released, an element of another set of change speed gears is held stationary and the frictional clutch is reset, all in successive and automatic order, substantially as specified.

7. A change speed gearing comprising a casing, a shaft journaled in said casing, a source of power, a frictional clutch coupling said shaft with said source of power, one or more revoluble housings mounted on said shaft, change speed gear sets in each housing, a grip ring encircling said housing by which one of the elements of the change speed gear set is held stationary, a fluid pump, a cylinder with plungers working therein adapted to compress the grip ring to hold said element of the speed change gear, a locking device to hold said grip, a hydraulic means for resetting the frictional clutch, substantially as described.

8. A change speed gearing comprising a casing, a shaft journaled therein, a source of power, a frictional clutch coupling said shaft with said source of power, revoluble housings on said shaft, change speed gear sets on said housings, grip rings encircling said housings, said grip rings adapted to hold stationary one of the elements of the change speed set, hydraulic means for closing said grip rings to hold said element stationary, means for automatically locking said grip, means for again releasing said grip and means for automatically and hydraulically resetting the frictional clutch, substantially as specified.

9. A change speed gearing comprising a casing, a shaft journaled therein, a source of power, a clutch coupling said shaft with said source of power, revoluble housings on said shaft, change speed gear sets in said housings, hydraulic means for holding stationary one of the elements of said change speed gear sets, means for releasing at the same time an element of another set of change speed gears, hydraulic means for automatically resetting the frictional clutch, a single element, means by which all these functions are made active by a single movement of said single element, substantially as described.

10. A change speed gearing comprising a casing, a shaft journaled therein, a source of power, a clutch coupling said shaft with said source of power, speed change gears mounted on said shaft, means for releasing said clutch, hydraulic means to make either of said change speed gear sets active, means for making either of said sets inactive and hydraulic means for reëngaging said clutch, substantially as specified.

11. A change speed gearing comprising a shaft, a source of power, a clutch coupling said shaft with said source of power, speed change gearing sets mounted on said shaft, means for disengaging the driving action through one of said sets of change speed gearing, means for engaging the driving action through another set of said gearing, means for resetting said clutch, a shaft with cams thereon through which by a single movement of same it releases said clutch, disengages the driving action through one set of change speed gears, engages the driving action through another set of change speed gears and reëngages said clutch, substantially as specified.

12. A change speed gearing comprising a shaft, a source of power, a clutch coupling said shaft with said source of power, speed change gearing sets mounted on said shaft, grip rings encircling said speed change gearing sets, said grip rings adapted to hold one of the elements of said speed change gearing sets, means for holding said grip ring stationary, a cylinder located by said grip ring, a plunger in said cylinder by which a fluid pressure upon said plunger serves to press said grip ring holding said element of the change speed gear set stationary, means to hold said grip independent of the plunger movement, substantially as specified.

13. A change speed gearing comprising two shafts in alinement, a frictional clutch, a source of power, the first of said shafts coupled to said source of power by said frictional clutch, change speed gear sets mounted on said first shaft, means for connecting power through one of said change speed gear sets and disconnecting the power from another set, a revoluble housing loosely mounted on the second of said shafts, gears in said housing, means for holding said housing from rotation by which a reverse motion to said second shaft is attained, substantially as specified.

14. A change speed gearing comprising two shafts in alinement, a frictional clutch, a source of power, the first of said shafts coupled to the source of power by said frictional clutch, change speed gear sets mounted on said first shaft, means for connecting the power through one set of said change speed gear sets and disconnecting the power from another set, a revoluble housing loosely mounted on the second of said shafts, planetary gears on said housing, an internal gear engaging with said planetary pinions, said internal gear secured to said second shaft, means for holding said housing stationary by which a reverse motion is attained, and means for coupling said housing with said first shaft, substantially as described.

15. A change speed gearing comprising a shaft, a frictional clutch, a source of power, said shaft coupled with said source of power by said frictional clutch, speed change gear sets mounted on said shaft means for releasing said frictional clutch, means for releasing the power from one set of change speed gears, means for engaging the power through another set of change speed gears, means for automatically resetting the frictional clutch and means by which through the movement of a single element these operations are automatically and successively made, substantially as specified.

16. A change speed gearing comprising a shaft having speed gear sets thereon, a source of power, a frictional clutch coupling said shaft with said source of power, gripping devices for connecting the power through the various change speed gears, means for releasing said gripping devices, a fluid pump, a cylinder with each of the change speed gear set gripping devices, a plunger in said cylinder by which said gripping devices are made active by the fluid from the said pump, to engage the power through either of the change speed gear sets, a cylinder with a plunger by which the said frictional clutch is reëngaged, substantially as specified.

17. A change speed gearing comprising a shaft, a frictional clutch, sets of change speed gearing on said shaft, hydraulic means for making one set of said gearing active, means to make another set inactive, hydraulic means to set the frictional clutch, a hydraulic pump, cylinder with pistons to effect the said hydraulic means, valves moved by cams for controlling the flow of fluid to either of said cylinders, a spring pressed valve controlling the flow of fluid to the cylinder which sets the frictional clutch, a plunger which releases the fluid after said hydraulic means have effected their work, substantially as specified.

18. A change speed gearing comprising means for power connection therewith, a plurality of speed elements, a single element, means by which through one movement of said single element said power connection is disengaged therefrom, another power connection through one of the said speed elements is disengaged, means by which said movement of the said single element actuates means by which the motion of the elements of the gear engages the last-named power connection through another of said speed elements and reëngages said first-named power connection therewith all in automatic succession, substantially as set forth.

19. A change speed gearing comprising means for power connection therewith, a plurality of speed elements, a single element, means by which through one movement of said single element said power connection is disengaged therefrom, another power connection through one of the said speed elements is disengaged, means by which said movement of the said single element actuates means by which the motion of the elements of the gear engages the said last named power connection through another of said speed elements, all in automatic succession, substantially as specified.

20. A change speed gearing comprising a casing, two shafts journaled therein, a frictional clutch connecting one of said last-named shafts with a source of power, revoluble housings mounted on said shaft, change speed elements in said housings, a single element, grip rings encircling said housings by which said change speed elements are alternatively made effective by means of the movement of said single element, substantially as specified.

21. A change speed gearing comprising a casing, two shafts in alinement journaled therein, a frictional clutch connecting one of said shafts to a source of power, a plurality of change speed elements mounted in housings carried on said shaft, slitted grip rings encircling said housings, cylinders secured to said casing located at each grip ring, movable plungers in said cylinders, said plungers engaging said grip rings on one side of the slit, a support engaging the other side of said slit, means to move said plungers to force and clamp said grip ring on an element in said housing to hold same stationary by which said change speed elements are made operative, substantially as set forth.

In testimony whereof I have affixed my signature in the presence of two witnesses.

ABRAHAM B. LANDIS.

Witnesses:
  C. A. HUNSBERGER,
  STANLEY W. CHUTE.